June 10, 1930.  J. H. BLAIR  1,762,287
LAWN MOWER
Filed June 21, 1926  2 Sheets-Sheet 1
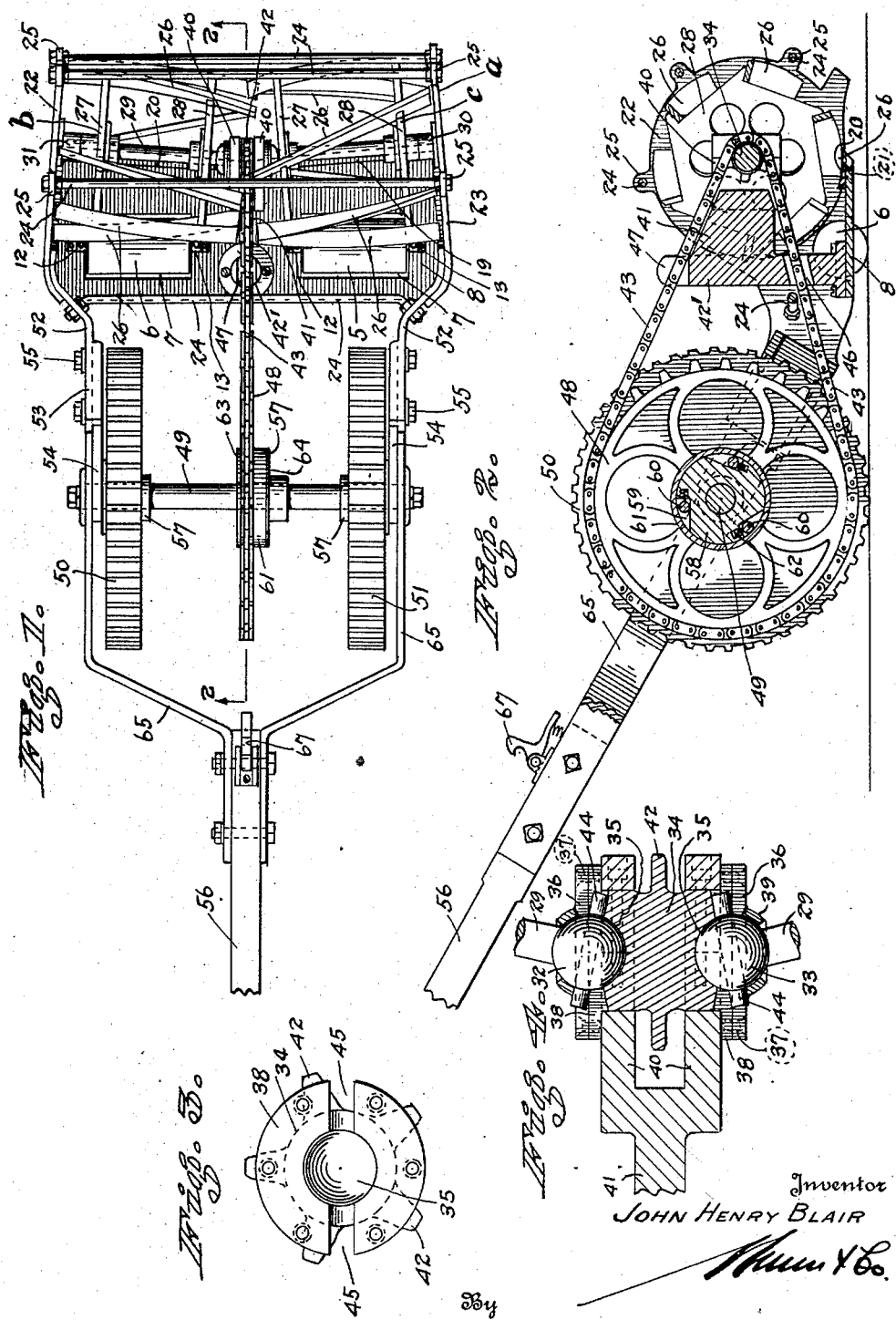
Inventor
JOHN HENRY BLAIR
By
Attorneys

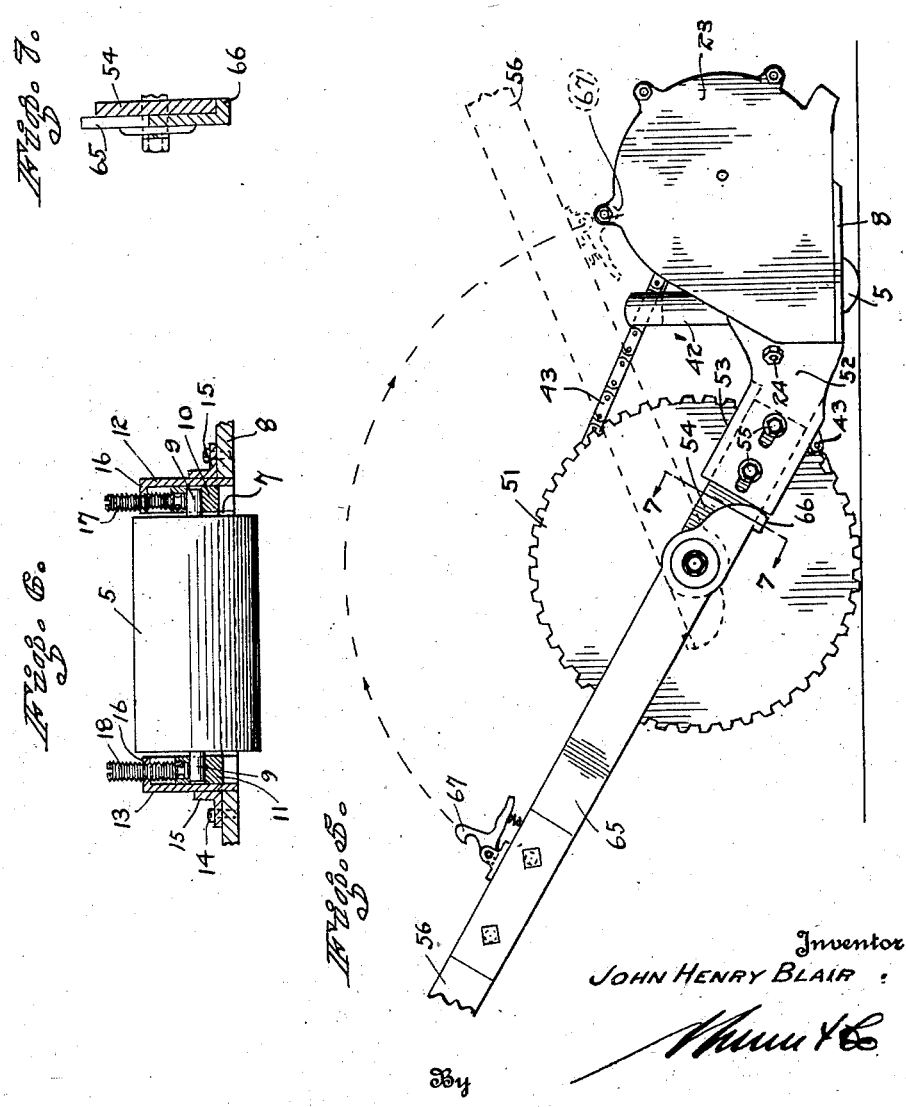

Patented June 10, 1930

1,762,287

UNITED STATES PATENT OFFICE

JOHN HENRY BLAIR, OF SAN FRANCISCO, CALIFORNIA, ASSIGNOR TO WILLIAM F. HOLLINGSWORTH, OF SAN FRANCISCO, CALIFORNIA

LAWN MOWER

Application filed June 21, 1926. Serial No. 117,456.

The general object of the present invention is to adapt a lawn mower for cutting grass located adjacent to the trunks of trees or close to fences, the sides of walks, bushes and other parts in or adjacent to a lawn which have heretofore been inaccessible to the cutting blades of the conventional type of lawn mower.

Another object is to provide against the crushing or beating down of the grass by the mower prior to the time that the grass is engaged and cut by the blades of the mower.

The above and other objects are accomplished by instrumentalities pointed out in the following specification.

The invention is clearly defined in the claims.

A satisfactory embodiment of the invention is illustrated in the accompanying drawings forming part of the specification and in which Figure 1 is a plan view of the mower of the present invention showing a fragment of the handle.

Figure 2 is a vertical longitudinal section taken approximately on the line 2—2 of Figure 1 and looking in the direction of the arrows.

Figure 3 is a detail side elevation of one element of the flexible connection between the driving wheels and the rotary cutters.

Figure 4 is a detail sectional plan of the flexible transmission mechanism for the rotary cutters.

Figure 5 is a detail side elevation of the invention showing by full lines the relation of the parts in their normal operative position and further showing by dotted lines the positions the parts occupy when the handle is folded preparatory to transporting the device in inoperative position from place to place.

Figure 6 is a detail section of the adjustable mounting for one of the rollers.

Figure 7 is a detail cross section of the construction for holding the handle in operative position.

The mower of the present invention comprises a main frame $a$ which is disposed horizontally and maintained in spaced relation to the ground by a pair of horizontally disposed rollers 5 and 6 disposed in recesses 7 of a bottom plate 8. Trunnions 9 at the central portions of the ends of rollers 5 and 6 are disposed in recessed bearing blocks 10 and 11, as shown in Figure 6. The blocks are confined in casings 12 and 13 rigidly secured to the bottom plate by screws 14 extending through lugs 15 rigidly secured to and extending laterally from the casings 12 and 13 as shown in Figure 6. The upper ends of the casings 12 and 13 have plates 16 which are provided with screw threaded openings for adjusting screws 17 and 18, the lower inner ends of which are swiveled in the bearing blocks 10 and 11 and operate to support the bearing blocks with their rollers 5 and 6 and to effect vertical adjustments of the rollers to vary the distance between the bottom plate 8 and the ground, as will be seen in Figures 2 and 6.

The bottom plate 8 is oblong and flat, and the rollers 5 and 6 are disposed between the longitudinal middle portion and rear side of the plate. The opposite or forward side of the plate is provided with a stationary blade made up of two obliquely disposed sections 19 and 20, which are adjustably secured to the plate as by screws 21. The cutting edges of these blades are in a common horizontal plane and the adjacent ends of the blades abut, the cutting edges being disposed forwardly of the bottom plate 8 as shown in Figure 2.

The side plates 22 and 23 of the frame are rigidly connected to the ends of bottom plate 8 and extend vertically upward with their forward portions extending beyond the sections 19 and 20 of the stationary blade. Suitable stay rods 24 extend through radial lugs 25 on the peripheries of the side plates 22 and 23 and operate to reinforce the frame.

Two cutting reels $b$ and $c$ are disposed within the frame $a$. Each cutting reel consists of a plurality of spiral knives 26 set in the recessed peripheries of two disks 27 and 28. Each reel is provided with an axially disposed shaft 29 rigidly secured to the disks 27 and 28. The outer end portions of the shafts are disposed in bearings 30 and 31 on the inner faces of the side plates 22 and 23. It is to be noted on reference to Figure 1 that the side plates 22 and 23 converge forwardly and the cutting reels $b$ and $c$ are disposed with their shafts 29 substantially in a vertical plane with the blade sections 19 and 20, the said shafts being disposed in a common horizontal plane and at right angles to the side plates 22 and 23. The inner ends of the shafts 29 terminate in spheres 32 and 33 which are disposed on either side of the transverse central line of the frame $a$. A sprocket wheel 34 is disposed with its axis in the horizontal plane of the shafts 29 and is arranged between the spherical end portions 32 and 33 of the shafts. The end portions of the hub of the sprocket wheel 34 are provided with axially disposed hemispherical depressions 35 for the spheres 32 and 33, and retainers are provided in the form of rings 36—36 which are rigidly secured as by screws 37 to annular flanges 38 on the opposite ends of the hub of the sprocket wheel 34, all of which is shown in Figure 4.

In Figure 4 it is to be noted that the inner peripheral portions of the rings 36—36 are flared outwardly on curved lines so as to provide concave sockets for the outer segments of the spheres 32 and 33. The hub of the sprocket 34 is rotatably mounted in oppositely disposed arms 40—40 at the forward end of a horizontally disposed bracket arm 41. The teeth 42 of the sprocket 34 are arranged between the arms 40 as shown. The bracket arm 41 is carried by an upright post or standard 42' rigidly secured adjacent to the rear side portion of the bottom plate 8 and midway between the ends thereof as shown in Figures 1 and 2. The combined lengths of the reels $b$ and $c$ approximate the distance between the side plates 22 and 23. In arranging the reels within the frame, however, the adjacent end portions of the blades 26 of one reel are disposed opposite to the space between adjacent blades of the adjacent reel. The shafts 29 however are at right angles to the side plates 22 and 23 and oblique with respect to the axis of the hub of sprocket wheel 34 so that the reels $b$ and $c$ extend forwardly on divergent lines from the center of the frame and as a consequence of this the adjacent end portions of the blades on the forward sides of the reels in the rotation thereof are disposed in a common plane and a space or clearance is provided between the adjacent ends of the blades on the rear sides of the reels in the rotation thereof, all of which is shown in Figure 1.

It is to be noted that the bracket arm 41 extends into the clearance between the rear portions of the reels and that the sprocket chain 43 trained around the sprocket 34 passes rearwardly through the clearance between the rear portions of the reels.

With this construction it is obvious that the stationary blade sections 19 and 20 are respectively disposed at a tangent to the respective reels $b$ and $c$ so that the edges of the cutting and stationary blades are appropriately disposed to cut or shear the grass entering between the cutting edges. It is to be further noted that by reason of the relation of the ends of the blades on the forward sides of the reels, the cutting blades are enabled to operate on all the grass disposed between the sides plates 22 and 23 of the frame; therefore, there will be an absence of ridges or uncut blades of grass in the area of the lawn traversed by the reels $b$ and $c$.

Motion from the sprocket wheel 34 is transmitted to the shafts 29 by pins 44 passing as diameters through the spheres 32 and 33. The projecting end portions of these pins are disposed in oppositely disposed transverse recesses 45 in the rings 36—36 and flanges 38, the said recesses providing a clearance and bearings for the projecting end portions of the pins 44 in the rotation of the shafts and sprocket. The upper and lower runs of chain 43 are directed through recesses 46 and 47 respectively disposed in the lower and upper ends of the standard 42, the said runs extending rearwardly and around a driving sprocket wheel 48. The driving sprocket 48 is relatively large so that the cutting reels are rotated at a relatively high rate of speed as is usual in devices of this kind. The driving sprocket is loosely mounted upon the driving axle 49, on the end portions of which are loosely mounted the driving wheels 50 and 51. The side plates 22 and 23 are provided with rearwardly and upwardly extending arms 52—52, and each of these arms consists of telescoping sections 53 and 54 which are adjustably connected by set screws 55 which permit of longitudinal variations of the arms and as a means for securing the arms in any of their adjusted positions. The sections 54 are provided with bearings for the ends of the axle 49 so that longitudinal adjustment of the arms 52 will effect the tightening or loosening of chain 43.

Over-running clutch structures 57 are provided between the sprocket wheel 48 and the axle 49, and also between the driving wheels 50 and 51 and the said axle. These clutch structures 57 engage upon forward motion of the mower with respect to the operator when the handle 56 is pushed, and disengage when the mower is pulled or moved rearwardly or in the opposite direction. Each of the said clutches 57 comprises a disk 58 fixedly secured to the axle 49 and peripherally provided with a plurality of notches 59 in which are disposed rollers 60 which are retained by a housing 61 surrounding the disk and loose upon the axle 49. The rollers are yieldingly held in contact with the inner surface of the housing by compression springs 62 set into sockets in one end of the recesses. The sprocket wheel 48 is rigidly secured to the housing 61 at the central portion of the axle and this housing is closed at one side by a plate 63, and a removable plate 64 secured to housing 61 provides a closure for the opposite side of the housing. The housing used in connection with the drive wheels 50 and 51 is formed integral with the wheels and is closed at one side by the outer side faces of the wheels, and suitable retaining plates are secured to the inner sides of the housing for preventing displacement of the rollers therein. The handle 56 is provided at its forward end with a yoke 65 which straddles the driving wheels and is turnably mounted upon the outer end portions of the axle 49. The forward end portion of each side of the yoke is provided with an inturned lower side portion 66 as shown in Figure 7 to engage on the underside of the adjacent sections 54 of one of the arms 52 so as to provide a stop for limiting the movement of the handle 56 in one direction. The handle as will be noted is provided with a latch 67 and in that the handle is permitted to swing forwardly and over the cutting reels, the latch 67 is so positioned as to engage with one of the stay rods as shown by dotted lines in Figure 5. This permits of turning the frame a upwardly and rearwardly when the handle is turned to the full line position shown in Figure 5 so that the mower may be transported readily from place to place with the frame a disposed above the ground. In connection with the foregoing it is to be observed that the driving wheels 50 and 51 by virtue of their arrangement on the shaft and between the sides of the extension 52 of frame a, are disposed rearwardly of the cutting mechanism and inwardly beyond the outer ends of the reels, so that their absence from the conventional arrangement at the sides of the frame prevents the rolling down of uncut grass by the mower in the movement of the same over the lawn. This positioning of the driving wheels also permits of a close approach of the cutting blades to objects such as the trunks of trees, the sides of walks and the like, disposed laterally beyond the mower, it being obvious that the thinness of the side walls 22 and 23 is such as to permit the cutting mechanism to approach the side of a walk and the like, and operate on the grass adjacent thereto and cut the same to within a fraction of an inch from the object. This quality on the part of the present invention renders unnecessary the operation of trimming the edges of a lawn and portions thereof adjacent to fences and the like, with hand shears.

Although I have shown and described one embodiment of my invention, it is to be understood that the same is susceptible of various changes; and I reserve the right to employ such as may come within the scope of the appended claims.

I claim:
1. In a lawn mower, a pair of cutting reels extending at an inclination with respect to each other and having overlapping portions so as to present a continuous cutting surface throughout the length of the two reels, and cutting blades positioned beneath the two reels and cooperating therewith.

2. A lawn mower comprising a frame, a rotary cutting mechanism carried by said frame and including a pair of reels disposed at an inclination with respect to each other and having overlapping portions so as to present a continuous cutting surface throughout the entire length of the two reels on one side thereof, the opposite side of said reels having the adjacent ends thereof spaced apart, a flexible coupling interconnecting said reels, and operative means passing between the spaced adjacent ends of the reels and being connected to said coupling for rotating said reels.

3. A lawn mower comprising a frame, a rotary cutting mechanism carried by said frame and including a pair of reels disposed at an inclination with respect to each other and having overlapping portions so as to present a continuous cutting surface throughout the entire length of the two reels on one side thereof, stationary cutting blades disposed beneath said rotary cutting mechanism and mounted with their axes parallel to the axes of said reels, driving wheels carried by the frame and disposed rearwardly of the cutting mechanism, shafts carried by said reels and extending axially thereof, a flexible coupling interconnecting said shafts, and operative means connecting the driving wheels with the flexible coupling for transmitting motion from the driving wheels to the reels.

4. In a lawn mower, a frame, a pair of cutting reels carried by said frame, said reels extending at an inclination with respect to each other and having overlapping portions so as to present a continuous cutting surface throughout the entire length of the two reels on one side thereof, the opposite side of said reels having the adjacent ends thereof spaced apart, driving wheels carried by said frame, and operative means connecting said wheels with said reels for transmitting motion from the driving wheels to the reels, said means extending through space between said reels.

JOHN HENRY BLAIR.